Dec. 18, 1962      Q. BERG      3,068,566
METHOD OF SOLDER COATING STRIP STOCK
Filed Sept. 19, 1958
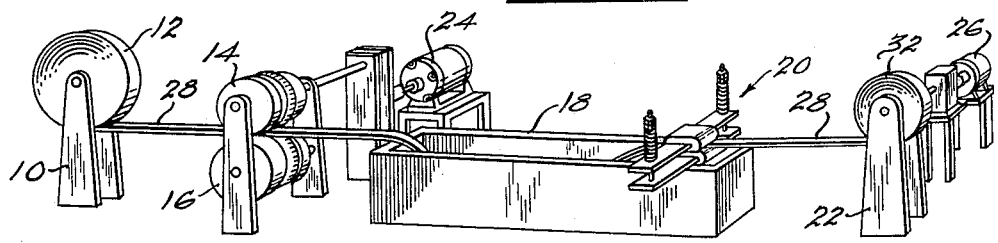
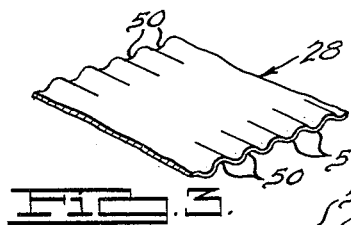
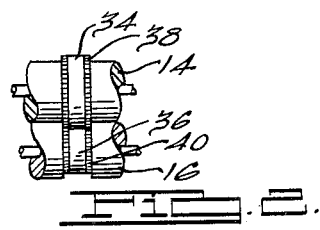
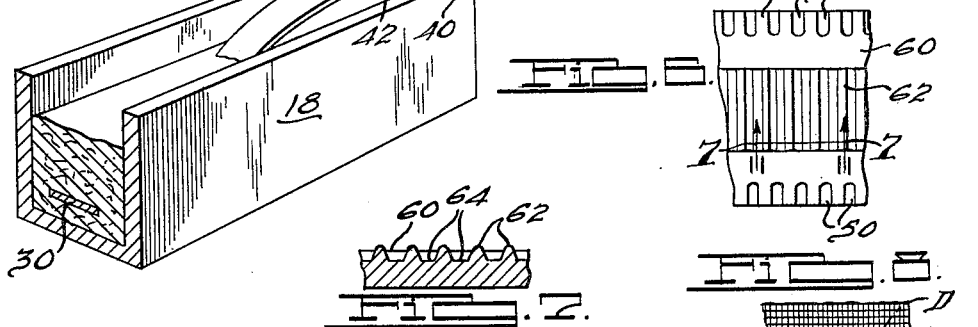
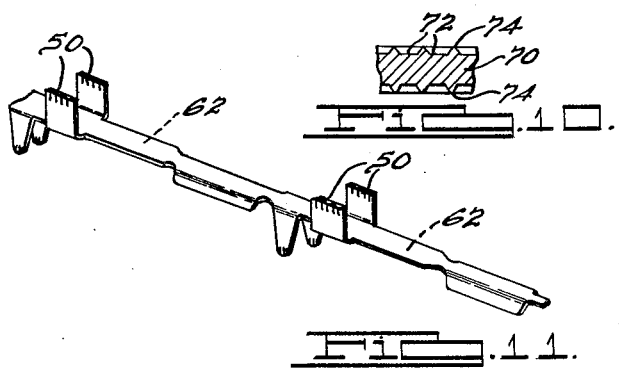
INVENTOR.
Quentin Berg.
BY
Balluff & McKinley
ATTORNEYS.

United States Patent Office 3,068,566
Patented Dec. 18, 1962

3,068,566
METHOD OF SOLDER COATING STRIP STOCK
Quentin Berg, 1550 Brandt Ave., New Cumberland, Pa.
Filed Sept. 19, 1958, Ser. No. 761,995
9 Claims. (Cl. 29—527)

This invention relates to a new and improved method of solder coating and has particular reference to a method of solder coating strip stock of metal, such as brass and copper, of the type used in the manufacture of electric terminals.

In the manufacture of various electrical devices it is the practice to solder in one operation a large number of terminals to another part, such as a printed circuit board or the like, by dipping multiple assemblies in a bath of solder. Because of the problems encountered in so applying molten solder to an assembly of parts, it is desirable to precoat the terminals with solder to facilitate the soldering operation. However, conventional techniques are unsatisfactory, particularly where precise requirements and low costs are important. The "tinning" or very thin coating (.000025 inch thick) frequently applied to brass strip does not afford uniformly good solder joints (when using the dip method) because by the time the dip soldering operation is performed such coating has oxidized and/or has been absorbed into the base metal.

This invention contemplates an extremely simple and efficient method of accurately and economically solder coating strip stock, such as brass, tinned brass, and copper, used in making electric terminals.

A principal object of the invention, therefore, is to provide a novel, efficient and simple method of solder coating metal stock.

Other and further objects of the invention will be apparent from the following description and claims and may be understood by reference to the accompanying drawing, which by way of illustration shows preferred embodiments of the invention and the best mode of applying the principles of my invention. Other embodiments of the invention may be used without departing from the scope of the present invention as set forth in the appended claims.

In the drawings:

FIGURE 1 is a schematic view of apparatus which may be used in practicing the process;

FIGURE 2 is an elevational view of the corrugating rolls;

FIGURE 3 is an enlarged fragmentary view of the strip stock after it has been corrugated;

FIGURE 4 is a fragmentary view illustrating the step of applying solder to the stock and of removing excess solder therefrom;

FIGURE 5 is a side elevational enlarged fragmentary view of a strip of such stock precoated with solder;

FIGURE 6 is an enlarged fragmentary view of a piece of strip stock which has been corrugated at its edges and serrated along its center;

FIGURE 7 is an enlarged fragmentary section taken along the line 7—7 of FIGURE 6;

FIGURE 8 is a fragmentary view of a strip of terminal stock wherein the surface has been distorted by "honeycombing" it with indentations or voids;

FIGURE 9 is an enlarged fragmentary view of that part of the strip indicated by the circle D in FIGURE 8;

FIGURE 10 is a section along the line 10—10 of FIGURE 9; and

FIGURE 11 is a strip of terminals formed out of the stock shown in FIGURES 6 and 7.

As shown in FIGURE 1, the apparatus consists of a standard 10 for rotatably supporting a coil 12 of brass stock to be solder coated, rolls 14 and 16, a solder pot 18, a wiper indicated generally at 20, and a motor-driven device 22 for coiling the solder coated stock to form coil 32. The solder pot 18 is heated and maintained at a suitable temperature to maintain the solder in a molten condition by any conventional heating means (not shown). A motor 24 is drivingly connected to the rolls 14 and 16 for driving the same, and the device 22 also includes a motor 26 for driving the same so as to coil the solder coated stock.

In practicing the process a strip 28 of stock of a solderable metal, such as brass or copper of the type commonly used in making electric terminals, is fed from the coil 12 through and between the rolls 14 and 16, through the solder pot 18 so as to apply solder thereto, through the wiper 20, and on to the device 22 which functions to recoil the stock. The motor 24 for the rolls 14 and 16 is driven at such a rate so that a loop 30 in the strip 28 dips into the molten solder in the solder pot 18, and the motor 26 for the reeling or coiling device preferably is operated at the same speed as the motor 24. It will, however, be appreciated that some control of the respective speed of the motors 24 and 26 will be necessary since the speed of the strip stock 28 will increase as the diameter of the coil 32 being formed on the device 22 increases.

The strip stock 28 is prefluxed, or flux may be applied to the strip 28 in any conventional manner. The make-up of the solder 30 and the flux used will vary depending upon the metals of the solder system being formed, the nature of the joint desired, and other relevant factors well understood in the art of soldering.

The rolls 14 and 16 are provided with cooperating roll sections 34 and 36 provided with corrugation-forming teeth 38 and 40. The stock 28 is fed between the roll sections 34 and 36 where the edges are uniformly corrugated in the manner illustrated in FIGURE 3 essentially and primarily to form small voids or pockets in the surface of the stock as distinguished from merely bending the stock back and forth.

For example, when using .010 tinned brass in forming some some terminals, I have found it desirable to form the corrugations .008 inch deep by .010 inch wide and spaced .010 inch. The spacing, depth, width and shape of the corrugations are some of the factors that determine the amount of solder that will adhere to the stock, and the dimensions just given may be varied within wide limits, depending to some extent upon the metals of the solder system, the shape of the terminal to be formed, the solder joint to be formed, and the process used in forming such joint. However, the corrugations are of such size and number as not to significantly change the strip character of the stock or adversely affect its utility for forming terminals in strip form, while insuring an adequate solder coating on the stock. Preferably the depth of the pockets is less than the thickness of the metal stock. Furthermore, the corrugating produces no significant change in the width or length of the stock, or in the thickness thereof except for the fact that the overall thickness of the corrugated edges is increased to the extent the crests 53 of the corrugations plus the coating thereon may project above the normal surface of the strip with whatever solder coating may be left thereon. The corrugations form distorted surfaces on the stock to which the solder coating will adhere better than it will to the original flat surface of the stock, probably because of the irregular nature of such corrugated surfaces. The corrugations also substantially increase the surface of the stock and thus the interface between such surface and the solder coating is greater than where the coating is applied to the normal undistorted surface of the stock.

I have found, however, that in order to retain the solder on the strip and to prevent the removal of the solder by the wiper, the corrugations or pockets should be narrow in the direction of the wiping movement of the wipers relative to the strip. The temperature of the solder bath and the length of time that the strip is immersed in the solder should be such as to insure a metallurgical bond between the base metal and the solder so that the solder when solidified will adhere to the strip stock. Other methods of applying molten solder to the strip may be used. The corrugations form solder-receiving pockets, preferably of uniform size and uniformly spaced. The size of such pockets should be such as to insure the retention of sufficient solder therein after the wiping operation so as to obtain a solder coating 55 of the desired average thickness on the strip. Hence the pocket size may also vary widely depending upon a number of variables, such as the speed of the strip, the wiping pressure, the degree of solidification of the solder immediately prior to wiping, and the adherence of the solder to the base metal of the strip before wiping.

The wipers consist of a member 40 fixed to one end of the solder pot and carrying a wiper element 42 preferably formed of fiber-glass cloth. A second member 44 carrying a second similar wiper element 46 is positioned so that the strip 28 after it leaves the solder pot passes between the wiper elements 42 and 46, the member 44 being mounted so that it is biased toward the member 40 thereby to cause the wiper elements 42 and 46 to squeeze the stock 28 as it passes therebetween thereby removing excess solder from the strip while permitting solder to remain in the corrugations or pockets 50. The thickness of the solder left in the pockets 50 may be controlled by the pressure exerted on the stock by the wiper elements 42 and 46. As only the edges of the strip 28 are corrugated, the wiper 20 will remove substantially all of the solder from the center of the strip 28 between the corrugations although, if required, the pressure of the wiper elements may be so adjusted and the form of such wipers may be such as to leave a solder coating on the center of the strip. The springs 52 backed up by nuts 54, which are threaded on the posts 56, permit the pressure of each side of the wiper to be adjusted. The solder removed by the wiper 20 is returned to the body of molten solder in the pot 18 while the solder which remains in the pockets 50 solidifies therein and adheres to the stock 28. Other forms of wipers may be used, and it is possible by controlling the speed of the stock and the temperature of the stock after the application of solder thereto to obtain a solder coating of the desired thickness by permitting excess solder to drain or drip from the stock. Unless carefully controlled, this method of removing excess solder will not produce a coating as uniform as when wipers such as those illustrated are employed, particularly where very thin coatings are desired. Preferably only sufficient solder is left in the pockets 50 to solder join the terminal formed from the strip to the part to which it is assembled so as to eliminate the necessity of supplying additional solder when the solder joint is made. The device 22 reels or coils the solder coated stock into a coil 32 which is adapted to be operatively mounted in connection with a terminal-making machine for making solder coated terminals from the stock 28.

Small uniformly spaced pockets are preferred for uniformity of results and economy, although the thickness of the solder coating applied will depend upon the joint to be formed and the process employed in forming the soldered joint. Desirably the average thickness of the solder coating is no greater than required for the soldered joint to be formed with the terminal made from the strip and substantially less than the nominal stock thickness of the strip.

The width of each pocket (i.e. in the direction in which each pocket moves past the wiper) should not be in excess of .125 inch, and preferably the width is less than .020 inch. The number of pockets per inch may vary widely, but there should be at least five per inch and preferably at least twenty-five, uniformly spaced. Where a large number of uniformly small pockets are employed, better adherence of the solder to the base metal and a more uniform coating are obtained.

Where additional solder is supplied at the time of forming the soldered joint, that is, at the time of soldering the terminal in the assembly of which it is to become a part, the solder coating may be much thinner than when no additional solder is supplied at the time of forming the soldered joint.

In FIGURE 6 there is shown a strip 60 of stock of a readily solderable metal having its edges corrugated in accordance with the process just described so as to form a series of solder-receiving pockets or voids 50. The strip 60 is also provided along its center with a series of serrations 62, the serrations being much finer or smaller than the corrugations forming the pockets 50. The serrations 62, as well as the pockets 50, may be formed in the strip 60 by the use of the technique just described using a suitable toothed or serrated section in the center of the rolls 14 and 16 to form the serrations 62 and the pockets or voids 64 therebetween. The section of the rolls used to form the serrations may be made by using a straight knurling tool on the rolls and then hardening and chrome-plating the rolls. The width of the pockets 64, that is, their direction lengthwise of the strip, may be but several thousandths of an inch. The serrations 62 and the pockets 64 form an extended surface well adapted for the reception and adherence of solder. The strip 60 is processed like the strip 28, and the pressure and form of the wipers 20 may be adjusted so as to leave little or no solder on the undistorted portions of the strip, that is, the portions between the serrations 62 and the corrugations 50, while leaving solder in the pockets 50 and 64. The strip shown in FIGURE 6 may be employed in forming the strip of terminals as shown in FIGURE 11.

FIGURES 8, 9 and 10 show a strip 70 in which the entire surface on one side is "honeycombed" to form pockets or voids 72 in the surface for receiving and holding solder. The strip 70 may be "honeycombed" by the process and apparatus shown in FIGURE 1, using rolls 14 and 16 having appropriate die surfaces for forming the voids 72. The pressure used in forming the voids 72 in the surface of the strip 70 creates cross ridges or serrations 74 which separate the voids 72 from each other. The pockets or voids 72 may have a dimension of approximately .010 inch in each direction. By distorting the surface as disclosed in FIGURES 8, 9 and 10, a uniform very thin coating of solder can be accurately applied to the strip, the thickness of the solder coating depending primarily upon the depth of the pockets 72 and the pressure of the wipers, as previously described. The pockets as shown in FIGURES 8, 9 and 10 are of such minute size that the wipers do not remove much if any solder from such pockets, and the solder therein provides excellent solderability both initially and after a period of storage.

I have found that distorting the surface just prior to solder coating exposes fresh surface of the strip to solder and this appears to result in a better solder bond to the base metal. By imprinting the strip to form a surface such as shown in FIGURES 8, 9 and 10 and wiping off excess solder, a very accurate thickness control on the finished strip is assured. This is very important in the formation of terminals, as die operations are dependent upon maintenance of uniform stock thickness. Where the material is "honeycombed" as shown in FIGURES 8, 9 and 10, the extra solder thickness will insure good unbroken coverage of the strip even after severe forming.

I have used the terms "serrating," "serrations," and "honeycombing" to refer to metal displacement without bending of the strip, and such serrations, as well as the "honeycomb" formation shown in FIGURES 8, 9 and 10, may also be considered as fine corrugations. The term "corrugations" has been used primarily to indicate the formation of small voids or pockets in the surface of the stock, as distinguished from merely bending the stock back and forth, although where the corrugations are relatively large and the stock relatively thin, some bending of the stock may occur. In any event, the function of the corrugations, serrations, or "honeycombing" of the surface is to form small solder-receiving voids or pockets in the surface of the strip well adapted for the reception and adherence of solder, and it will be appreciated that the distortion of the surface of the stock increases the exposed surface of the stock without significantly changing the strip character of the stock or adversely affecting its utility for forming terminals in strip form.

This application is a continuation-in-part of my prior copending application Serial No. 673,893, filed July 24, 1957, for "Method of Solder Coating," now abandoned.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. That method of solder coating only the edge of a strip of sheet metal stock such as brass or copper suitable for the manufacture of electric terminals which consists of corrugating the edge of a strip of stock so as to roughen the surface thereof to form a series of small solder-receiving pockets in such surface while maintaining the width of such strip, thereafter immersing the corrugated edge of said strip in a bath of molten solder so as to permit solder to adhere to such strip and to fill such pockets, and after emergence of the corrugated edge of said strip from said bath, wiping solder from the strip under controlled conditions so as to leave a thin continuous solder coating along the edge of said strip and solder in the pockets solder-joined to the metal of said strip whereby such wiping accurately sizes the overall thickness of the coated strip to a predetermined dimension.

2. That method according to claim 1 wherein said strip is provided with at least five pockets per inch uniformly spaced lengthwise of the strip and wherein the width of each such pocket is not greater than .125 inch.

3. That continuous method of solder coating a coil of strip metal stock such as brass or copper, suitable for the manufacture of electric terminals, which comprises continuously corrugating a moving strip of metal stock as it is unwound from a coil so as to roughen the surface thereof and thereby define a series of small solder-receiving pockets in the surface of the strip while maintaining the width thereof, and wherein the depth of such pockets is less than the nominal thickness of such stock, thereafter immersing the strip in a bath of molten solder so as to cause solder to adhere to such strip and to fill such pockets, and after emergence of said strip from said bath wiping excess solder from the strip under controlled conditions so as to leave a thin continuous solder coating on said strip and solder in the pockets solder-joined to the metal of the strip whereby such wiping accurately sizes the overall thickness of the coated strip to a predetermined dimension, and recoiling such strip.

4. That method according to claim 3 wherein only a portion of the strip widthwise thereof is corrugated.

5. That method of solder coating a strip of sheet metal stock such as brass or copper, suitable for the manufacture of electric terminals, which comprises continuously distorting the surface of a strip of stock to roughen such surface and thereby define a series of small solder-receiving pockets in such surface while maintaining the width of such strip, thereafter immersing such distorted surface in a bath of molten solder so as to cause such solder to adhere to such surface and to fill such pockets, and after emergence of said surface from said bath, wiping excess solder from said surface under controlled conditions so as to leave a thin continuous solder coating thereon and solder in the pockets solder-joined to the metal of the strip whereby such wiping accurately sizes the overall thickness of the coated strip to a predetermined dimension.

6. That method according to claim 5 wherein said surface is distorted by serrating.

7. That method according to claim 5 wherein said strip is provided with at least five pockets per inch uniformly spaced lengthwise of the strip and wherein the width of each such pocket is not greater than .125 inch, and wherein said strip is continuously moved while distorting the surface thereof and applying molten solder thereto.

8. That method of continuously solder coating a coil of strip metal stock such as brass or copper, suitable for the manufacture of electric terminals, which consists of continuously distorting the surface of a moving strip of metal stock as it is unwound from a coil so as to roughen such surface and thereby define a series of small solder-receiving pockets in such surface while maintaining the width of said strip and wherein the depth of said pockets is less than the nominal thickness of said stock, thereafter immersing such distorted surface in a bath of molten solder so as to cause solder to adhere to such surface and to fill such pockets, after emergence of such distorted surface from said bath wiping excess solder from such surface with a fiber glass cloth under controlled conditions so as to leave a thin continuous solder coating on such surface and solder in the pockets solder-joined to the metal of such strip whereby such wiping accurately sizes the overall thickness of the coated strip to a predetermined dimension, and recoiling such strip.

9. That method of continuously solder precoating a flexible strip of thin metal stock such as copper or brass, suitable for the manufacture of electric terminals, which consists of serrating the edge only of a strip of stock as it moves in the direction of its length to define a series of solder-receiving pockets therein spaced along the length thereof while maintaining the width of such strip, thereafter immersing the serrated edge of said moving strip in a bath of molten solder so as to fill such pockets with solder, and after emergence of the serrated edge of said strip from said bath, wiping solder from the strip under controlled conditions so as to leave a thin continuous solder coating along the edge of said strip and solder in the pockets solder-joined to the metal of the strip whereby such wiping accurately sizes the overall thickness of the coated strip to a predetermined dimension.

References Cited in the file of this patent

UNITED STATES PATENTS

| Number | Name | Date |
|---|---|---|
| 185,339 | Mackey | Dec. 12, 1876 |
| 1,143,211 | Lobley | June 15, 1915 |
| 1,184,654 | Lindhe | May 23, 1916 |
| 1,315,362 | Cumfer | Sept. 9, 1919 |
| 1,437,316 | Klein | Nov. 28, 1922 |
| 1,895,133 | Quarnstrom | Jan. 24, 1933 |
| 2,083,518 | Lorig | June 8, 1937 |
| 2,483,424 | Martines | Oct. 4, 1949 |
| 2,599,726 | Schluchter | June 10, 1952 |
| 2,634,493 | Rappaport | Apr. 14, 1953 |